(12) United States Patent
Ham et al.

(10) Patent No.: US 9,604,158 B2
(45) Date of Patent: Mar. 28, 2017

(54) SEPARATOR FOR SEPARATING FLUID AND SCR UREA INJECTION SYSTEM USING THE SAME

(71) Applicant: Hyundai Motor Company, Seoul (KR)

(72) Inventors: Chang Ho Ham, Ansan-Si (KR); Dong Myoung Ryoo, Yongin-Si (KR)

(73) Assignee: Hyundai Motor Company, Seoul (KR)

( * ) Notice: Subject to any disclaimer, the term of this patent is extended or adjusted under 35 U.S.C. 154(b) by 151 days.

(21) Appl. No.: 14/570,063

(22) Filed: Dec. 15, 2014

(65) Prior Publication Data

US 2015/0290586 A1 Oct. 15, 2015

(30) Foreign Application Priority Data

Apr. 11, 2014 (KR) ........................ 10-2014-0043369

(51) Int. Cl.
| | |
|---|---|
| *A47L 5/36* | (2006.01) |
| *B01D 19/00* | (2006.01) |
| *B01D 45/16* | (2006.01) |
| *B01D 45/12* | (2006.01) |
| *B01D 45/08* | (2006.01) |
| *B01D 50/00* | (2006.01) |

(Continued)

(52) U.S. Cl.
CPC ......... *B01D 19/0073* (2013.01); *B01D 45/08* (2013.01); *B01D 45/12* (2013.01); *B01D 45/16* (2013.01); *B01D 50/002* (2013.01); *F01N 3/208* (2013.01); *A47L 9/1683* (2013.01); *F01N 3/2066* (2013.01); *F01N 2610/02* (2013.01); *F01N 2610/1406* (2013.01); *F01N 2610/1466* (2013.01)

(58) Field of Classification Search
CPC ........ B01D 45/16; B01D 45/12; B01D 45/08; B01D 50/002; A47L 9/1683
See application file for complete search history.

(56) References Cited

U.S. PATENT DOCUMENTS

| 1,774,588 | A | * | 9/1930 | Brockway | ............ | F02M 35/022 |
|---|---|---|---|---|---|---|
| | | | | | | 55/452 |
| 2,628,894 | A | * | 2/1953 | Langmyhr | ........... | B01D 11/043 |
| | | | | | | 196/14.52 |

(Continued)

FOREIGN PATENT DOCUMENTS

| JP | 6-16816 Y2 | 5/1994 |
|---|---|---|
| JP | 8-14129 A | 1/1996 |

(Continued)

*Primary Examiner* — Dung H Bui
(74) *Attorney, Agent, or Firm* — Morgan, Lewis & Bockius LLP

(57) ABSTRACT

A separator apparatus for separating fluid may include a fluid inlet port into which the fluid in which gas and liquid may be mixed flows while being pressurized, a lower body which has a partition wall formed in an internal space of the lower body that fluid-communicates with the fluid inlet port, and an upper body which may be assembled to an upper opening portion of the lower body, and has a first gas discharge port that fluid-communicates with the internal space of the lower body to discharge gaseous fluid flowing into the lower body, wherein the partition wall divides the internal space of the lower body into a central portion and an outer peripheral portion on a basis of an axis thereof.

4 Claims, 8 Drawing Sheets

(51) Int. Cl.
*F01N 3/20* (2006.01)
*A47L 9/16* (2006.01)

(56) References Cited

U.S. PATENT DOCUMENTS

| | | | | |
|---|---|---|---|---|
| 2,689,623 | A * | 9/1954 | Schebler | B01D 45/08 55/342 |
| 6,546,593 | B2 * | 4/2003 | Oh | A47L 5/28 15/353 |
| 6,681,811 | B2 | 1/2004 | Channing | |
| 2002/0062632 | A1 * | 5/2002 | Oh | A47L 9/104 55/337 |
| 2006/0156699 | A1 * | 7/2006 | Kim | A47L 9/1608 55/345 |
| 2008/0190080 | A1 * | 8/2008 | Oh | A47L 9/1625 55/343 |
| 2009/0211764 | A1 * | 8/2009 | Fielding | B01D 45/16 166/357 |
| 2010/0224073 | A1 * | 9/2010 | Oh | A47L 9/1641 96/416 |
| 2013/0091815 | A1 * | 4/2013 | Smith | A47L 9/102 55/346 |
| 2013/0145732 | A1 * | 6/2013 | Gwynn | B01D 45/12 55/283 |
| 2014/0318088 | A1 * | 10/2014 | Bizzarro | B04C 5/06 55/450 |
| 2015/0052862 | A1 * | 2/2015 | Wakabayashi | B01D 45/08 55/462 |

FOREIGN PATENT DOCUMENTS

| | | |
|---|---|---|
| JP | 2007-270729 A | 10/2007 |
| JP | 2008-075527 A | 4/2008 |
| KR | 10-2002-0009539 A | 2/2002 |
| KR | 10-2013-0053531 A | 5/2013 |
| KR | 10-1323534 B1 | 10/2013 |

* cited by examiner

US 9,604,158 B2

SEPARATOR FOR SEPARATING FLUID AND SCR UREA INJECTION SYSTEM USING THE SAME

CROSS-REFERENCE TO RELATED APPLICATION

The present application claims priority to Korean Patent Application No. 10-2014-0043369 filed on Apr. 11, 2014, the entire contents of which is incorporated herein for all purposes by this reference.

BACKGROUND OF THE INVENTION

Field of the Invention

The present disclosure relates to a separator for separating fluid and a Selective Catalytic Reduction (SCR) urea injection system using the same. More particularly, it relates to a separator which may separate gas from a fluid in which liquid and gas are mixed, and may discharge the gas, and an SCR urea injection system which may separate and discharge urea gas, which is generated when urea is injected, using the separator.

Description of Related Art

As problems regarding environmental pollution have become a major social issue, emission gas regulations on vehicles having internal combustion engines that use fossil fuel are gradually getting strict. Particularly, because a nitrogen oxide (NOx), which is known as a substance that causes acid rain and respiratory diseases, is included in exhaust gas from a vehicle having a diesel engine, which uses diesel fuel, such as a bus or a truck, regulations on gas emission standard for a vehicle, which has been applied recently or will be applied, more severely limit emission standards of nitrogen oxides.

In order to cope with the emission standards, a method of reducing nitrogen oxides included in exhaust gas from the diesel engine for a vehicle by applying an SCR selective catalytic reduction (SCR) system to the vehicle is being used.

The SCR system removes the nitrogen oxide in the exhaust gas by reducing the nitrogen oxide into nitrogen and water using urea as a catalyst, and typically uses an amount of urea that reaches about 4 to 6% of an amount of consumed fuel in order to reduce the nitrogen oxide.

Therefore, the urea needs to be injected like the way that the vehicle is filled with fuel, and to this end, a urea tank is provided in the vehicle of a diesel engine together with a fuel tank.

Recently, the SCR system is mainly used in a large-sized vehicle such as a truck, and a range of application of the SCR system is recently being enlarged to a small-sized vehicle and a midsize vehicle.

As the range of application of the SCR system is enlarged, a small-sized urea tank is used such that frequency of injection of urea is increased, and the urea is injected using an injection gun in a gas station such that a speed when the urea is injected is increased, and a method of injecting the urea directed by a customer may be applied.

Accordingly, customer complaints may occur due to deterioration in injection performance because of injecting urea at a high speed, and an unpleasant odor due to ammonia gas that is generated when the urea is injected.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing ac separator for separating fluid which may separate gas from a fluid in which liquid and gas are mixed, and may discharge the gas.

In an aspect of the present invention, a separator apparatus for separating fluid, may include a fluid inlet port into which the fluid in which gas and liquid are mixed flows while being pressurized, a lower body which may have a partition wall formed in an internal space of the lower body that fluid-communicates with the fluid inlet port, and an upper body which is assembled to an upper opening portion of the lower body, and may have a first gas discharge port that fluid-communicates with the internal space of the lower body to discharge gaseous fluid flowing into the lower body, wherein the partition wall divides the internal space of the lower body into a central portion and an outer peripheral portion on a basis of an axis thereof.

The upper body may have a vent guide provided at a lower side thereof, and the vent guide is inserted between the lower body and the partition wall, and divides a space between the lower body and the partition wall into upper and lower spaces.

The vent guide is formed in a ring shape having an opened one side, wherein the vent guide may include a front end portion that faces the fluid inlet port, and a rear end portions formed in a spiral ring shape that is positioned at a higher position than the front end portion.

The vent guide may have a liquid resistance portion having a plurality of slot holes formed in the front end portion that faces the fluid inlet port.

The upper body may have a central pipe formed at a lower side thereof, and the central pipe is inserted into the partition wall of the lower body, and fluid-communicates with the first gas discharge port.

The partition wall may have a liquid discharge port at one side, which faces the fluid inlet port, to discharge a liquefied fluid flowing into the partition wall to an outside of the partition wall.

In an aspect of the present invention, an SCR urea injection system may include a urea tank connected to an injection port installed at one side thereof of the urea tank, a leveling pipe which is installed on the urea tank, and allows injection of urea to be stopped when the leveling pipe is shut off by the urea that is increased in the urea tank, and a separator which is connected with the leveling pipe through a urea vent line, separates gaseous urea in a urea fluid that flows in through the urea vent line, and discharge the gaseous urea.

The separator may include a fluid inlet port which is connected with the urea vent line, and into which the urea fluid in which the gaseous urea and a liquefied urea are mixed while being pressurized, a lower body which may have a partition wall formed in an internal space that fluid-communicates with the fluid inlet port, an upper body which is assembled to an upper opening portion of the lower body, and may have a vent guide that is formed at a lower side of the upper body, inserted between the lower body and the partition wall, and limits a flow path in an outer space of the partition wall to induce an annular flow of the fluid in conjunction with the partition wall, and a first gas discharge port which is formed at an upper side of the upper body, and fluid-communicates with the internal space of the lower body to discharge the gaseous fluid, wherein the partition wall divides the internal space of the lower body into a central portion and an outer peripheral portion on a basis of an axis thereof.

The upper body may have a vent guide formed at a lower side thereof, and the vent guide is inserted between the lower body and the partition wall, and divides a space between the lower body and the partition wall into upper and lower spaces.

The upper body may have a central pipe formed at a lower side thereof, and the central pipe is inserted into the partition wall of the lower body, and fluid-communicates with the first gas discharge port.

The vent guide is formed in a ring shape having an opened one side, and a rear end portion of the vent guide is formed in a spiral ring shape that is positioned at a higher position than a front end portion that faces the fluid inlet port.

The vent guide may have a liquid resistance portion having a plurality of slot holes formed in the front end portion that faces the fluid inlet port.

The partition wall may have a liquid discharge port at one side, which faces the fluid inlet port, to discharge the liquefied fluid flowing into the partition wall to the outside of the partition wall.

The lower body may have a second gas discharge port that fluid-communicates with the internal space of the lower body to recirculate a portion of the gaseous urea, and the second gas discharge port fluid-communicates with the injection port through a recirculation line.

A recirculation line is connected between a second gas discharge port of the separator and the injection port of the urea tank.

A check valve is connected to a first gas discharge port for discharging the gaseous urea in the separator, and opened and closed by pressure of a gaseous fluid that is supplied through the first gas discharge port.

The check valve may include a valve lower body which may have a valve inlet that fluid-communicates with the first gas discharge port of the separator, and a shut-off wall which shuts off an inflow of the gaseous urea that flows into the valve inlet, a valve upper body which is coupled to an upper portion of the valve lower body, a diaphragm which is mounted between the valve lower body and the valve upper body in a state in which a lower end of the diaphragm is tightly attached to an upper end of the shut-off wall to be detachable by pressure of the gaseous urea flowing into the valve inlet, and a return spring which is mounted between the valve upper body and the diaphragm, and restores the diaphragm separated from the shut-off wall.

An air vent line is connected to a valve outlet for discharging the gaseous urea in the check valve, and one end of the air vent line is formed to be directed toward an opposite side to the injection port of the urea tank to allow the urea gas discharged from the check valve to move to a location that is spaced apart from the injection port of the urea tank.

According to the present invention, it is possible to prevent customer complaints due to ammonia gas that is generated when the urea is injected, ensure performance in injecting the urea when the urea is injected at a high speed using an injection gun, and ensure pressure safety in the system after the urea is injected.

Other aspects and preferred embodiments of the invention are discussed infra.

It is understood that the term "vehicle" or "vehicular" or other similar terms as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuel derived from resources other than petroleum). As referred to herein, a hybrid vehicle is a vehicle that has two or more sources of power, for example, both gasoline-powered and electric-powered vehicles.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
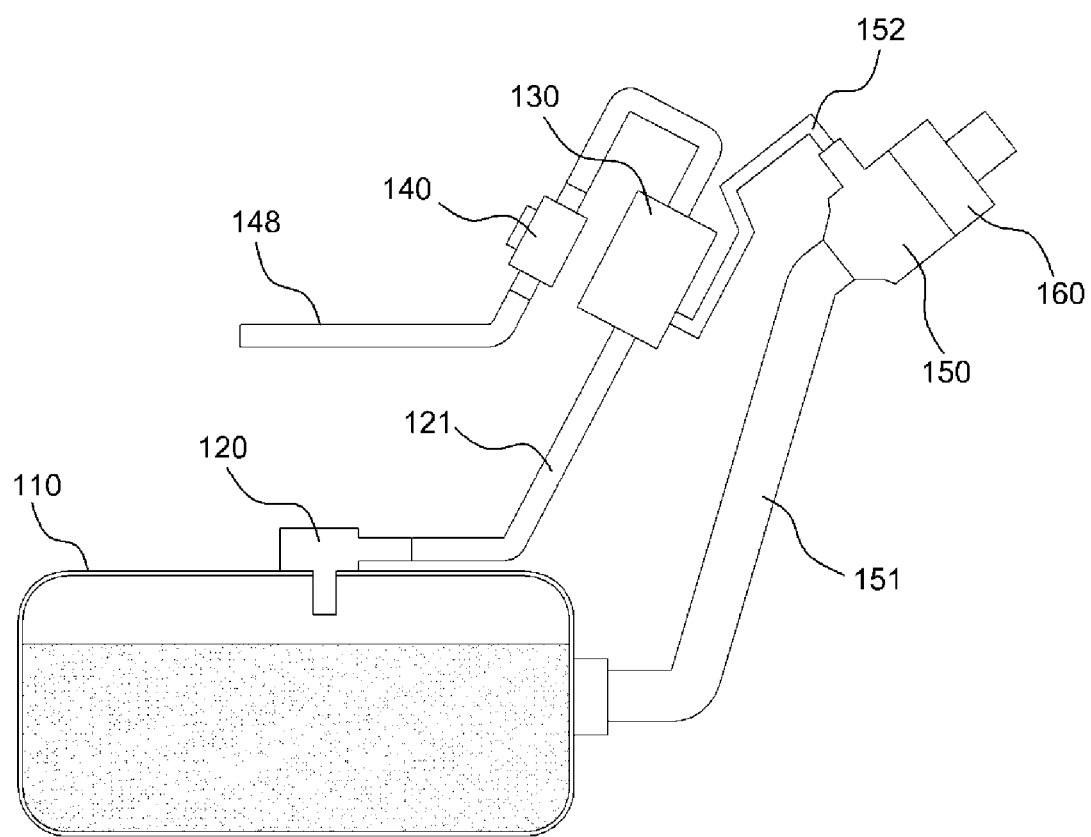
FIG. 1 is a configuration diagram illustrating an SCR urea injection system according to an exemplary embodiment of the present invention.
Figure 2:
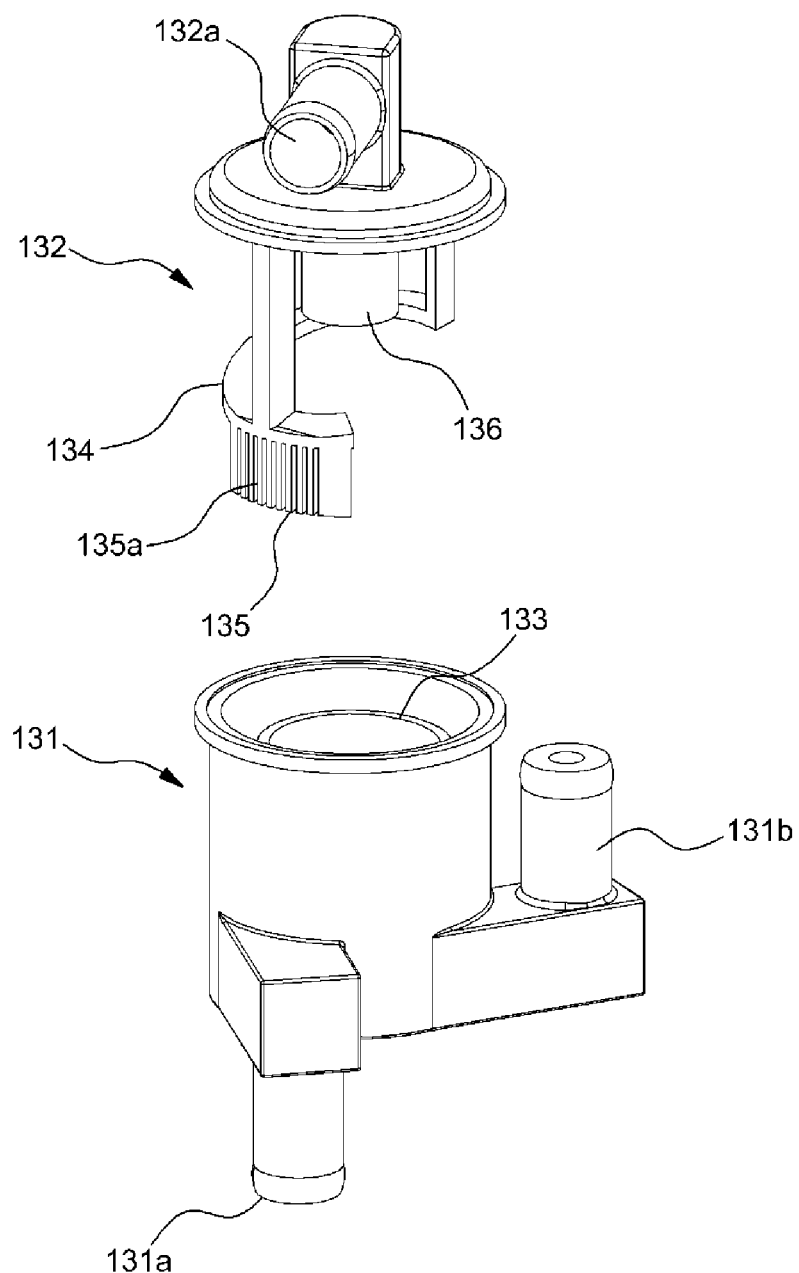
FIG. 2 is an exploded perspective view illustrating a separator according to the exemplary embodiment of the present invention.
Figure 3:
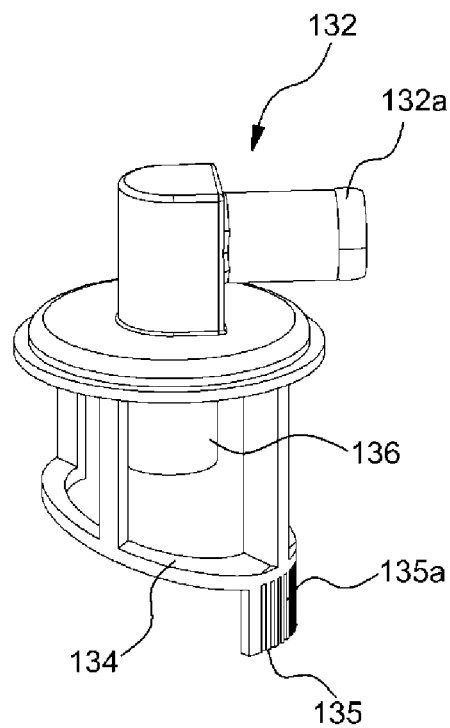
FIG. 3 is a view illustrating an upper body of the separator according to the exemplary embodiment of the present invention.
Figure 4:
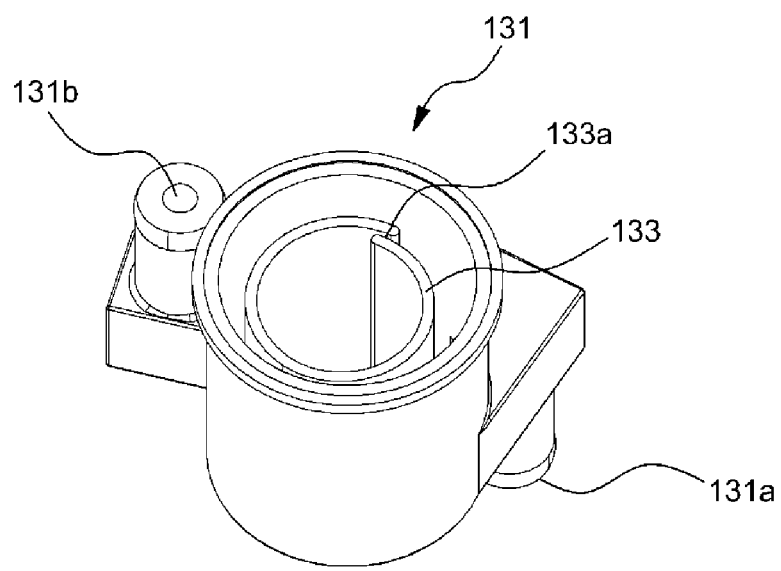
FIG. 4 is a view illustrating a lower body of the separator according to the exemplary embodiment of the present invention.
Figure 5:
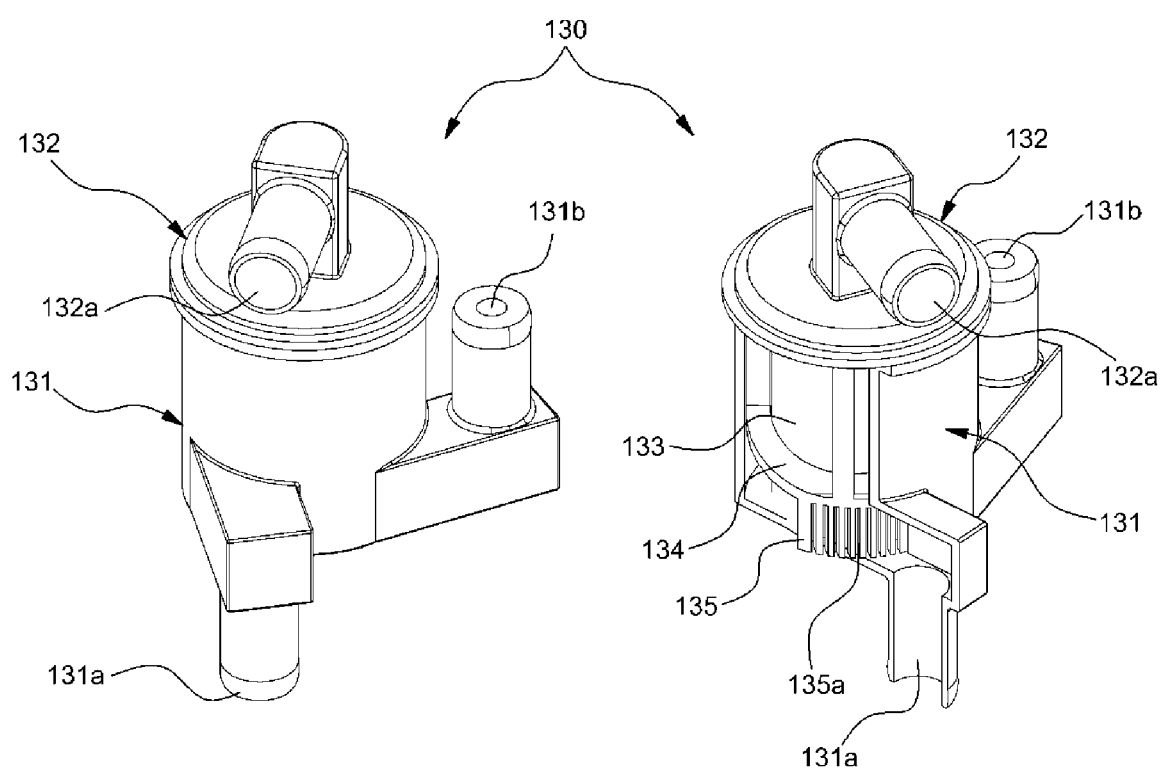
FIG. 5 is an outer perspective view and a cut-away perspective view illustrating the separator according to the exemplary embodiment of the present invention.
Figure 6:
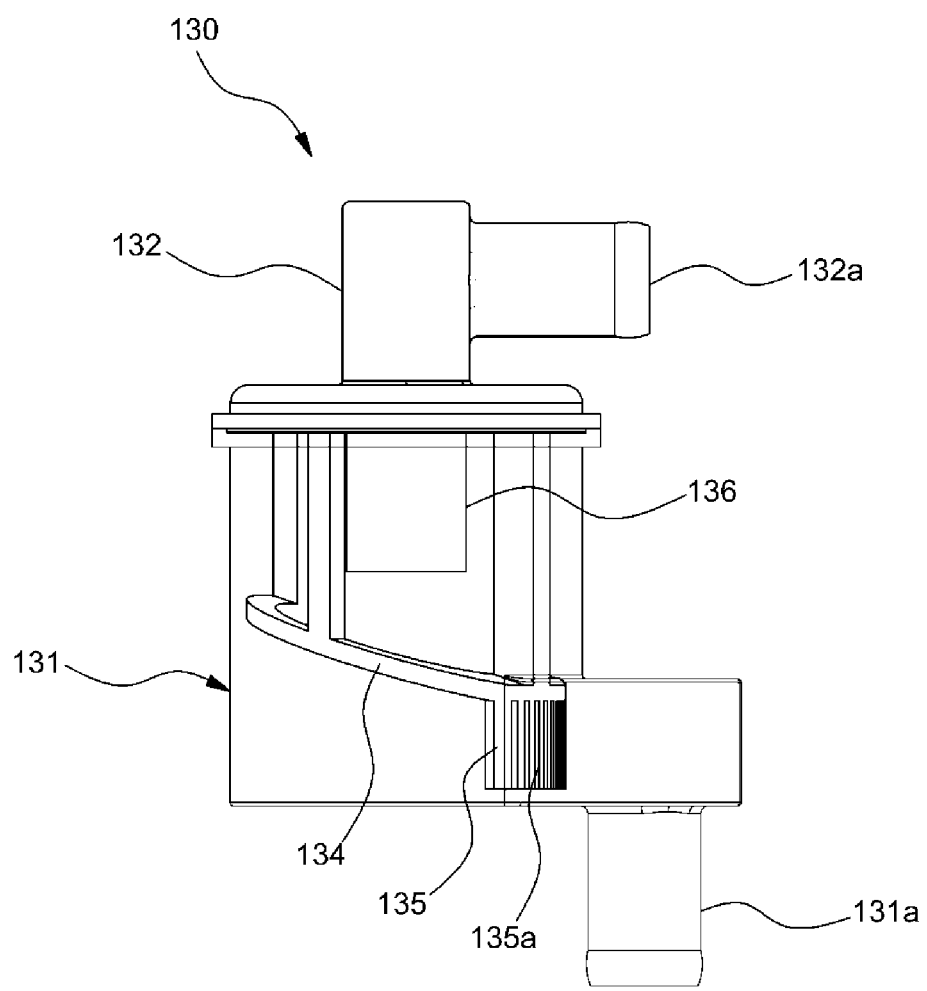
FIG. 6 is a projection view illustrating the separator according to the exemplary embodiment of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Hereinafter, the present invention will be described so that those skilled in the technical field to which the present invention pertains may carry out the present invention.

As illustrated in FIG. 1, an SCR urea injection system according to an exemplary embodiment of the present invention includes a urea tank 110, a leveling pipe 120, a separator 130, a check valve 140, and the like.

The urea tank 110 stores the urea injected through an injection port 150, and the injection port is installed at one side of the urea tank 110 through a urea injection line 151.

The leveling pipe 120 is installed on the urea tank 110, and allows the injection of the urea to be stopped and completed when the leveling pipe 120 is shut off by the urea that is increased in the urea tank 110. The leveling pipe 120 is installed on an upper end surface of the urea tank 110 in a state in which one end thereof enters the inside of the urea tank 110, and the other end of the leveling pipe 120 may be connected to the separator 130 through a urea vent line 121.

Since the leveling pipe 120 is generally well known, detailed explanation of the structure is omitted.

When the leveling pipe 120 is shut off in a case of in which a level of the urea rises in the urea tank 110 when the urea is injected at a high speed using a urea injection gun or the like, pressure in the urea tank 110 is instantaneously and rapidly increased such that the level of the urea in the urea injection line 151 rises, and as a result, the injection of the urea is automatically stopped.

That is, the leveling pipe 120 primarily determines and induces an injection amount of urea and an operation of shutting off the injection when the urea is injected at a high speed.

The separator 130 serves to separate gaseous urea (urea gas) and liquefied urea from a urea fluid (a mixture of gaseous urea and liquefied urea) which flows into the separator 130, and serves to discharge the gaseous urea into the atmosphere. The separator 130 prevents the urea from being additionally injected after the primary injection of the urea is stopped, and prevents the urea from overflowing to the check valve 140.

The urea fluid, which is discharged through the leveling pipe 120 when the urea is injected at a high speed, flows into the separator 130 through the urea vent line 121. In this case, a large resistance occurs at the liquefied urea in the urea fluid that flows into the separator 130 such that the inflow of the urea is automatically stopped, and a part of the liquefied urea flows into the separator 130 together with the gaseous urea.

Accordingly, as described above, the leveling pipe 120 is shut off such that pressure in the urea tank 110 is instantaneously and rapidly increased, and the level of the urea in the urea injection line 151 rises such that the injection of the urea is automatically stopped.

In this case, the urea fluid, which flows into the separator 130, is the gaseous urea (gaseous fluid) with which a small amount of liquefied urea (liquefied fluid) is mixed.

Referring to FIGS. 2 to 6, the separator 130 may include a lower body 131 which has a fluid inlet port 131a at a lower one side thereof, and an upper body 132 which is fixedly assembled to an upper opening portion of the lower body 131.

The fluid inlet port 131a is connected with the leveling pipe 120 through the urea vent line 121. Therefore, the urea fluid, which is discharged to the urea vent line 121 through the leveling pipe 120 when the urea is injected at a high speed, flows into the fluid inlet port 131a while being pressed by predetermined pressure.

The lower body 131 has an internal space that is integrally connected with the fluid inlet port 131a, and may communicate with the fluid inlet port 131a. An annular partition wall 133 is formed in the internal space, and the partition wall 133 divides the internal space of the lower body 131 into a central portion and an outer peripheral portion on the basis of an axis of the lower body 131.

The upper body 132 has a first gas discharge port 132a, which may communicate with the internal space of the lower body 131, at an upper side of the upper body 132. The gaseous urea in the urea fluid, which flows into the lower body 131, is discharged to the outside through the first gas discharge port 132a.

The upper body 132 has a vent guide 134 formed at a lower side of the upper body 132. The vent guide 134 is inserted between the lower body 131 and the partition wall 133, and limits a flow path in an outer space of the partition wall 133 so as to induce an annular flow of the urea fluid in conjunction with the partition wall 133.

The vent guide 134 is formed in a ring shape having an opened one side, and inserted between the lower body 131 and the partition wall 133 so as to divide a space between the lower body 131 and the partition wall 133 into upper and lower spaces. Particularly, a rear end portion of the vent guide 134 is formed in a spiral ring shape that is positioned at a higher position than a front end portion that faces the fluid inlet port 131a.

Accordingly, the urea fluid (specifically, gaseous urea), which is annularly rotated, rises at the rear end portion of the vent guide 134, and then may be moved into the partition wall 133 along the partition wall 133. In this case, a part of the liquefied urea rises together with the gaseous urea, and then may be moved into the partition wall 133.

The partition wall 133 has a liquid discharge port 133a formed at one side, which faces the fluid inlet port 131a, so as to discharge the liquefied urea flowing into the partition wall 133 to the outside of the partition wall 133. The liquefied urea discharged to the outside of the partition wall 133 is discharged through the fluid inlet port 131a at a point of time at which the injection of the urea is completed, and then collected into the urea tank 110.

The vent guide 134 has a liquid resistance portion 135 having a plurality of slot holes 135a formed in the front end portion that faces the fluid inlet port 131a of the lower body 131.

The liquid resistance portion 135 has the plurality of slot holes 135a, which is arranged in a row at the fluid inlet port 131a side through which the urea fluid needs to pass so as to enter the internal space of the lower body 131, such that the liquid resistance portion 135 hinders the inflow of the liquefied urea that flows in through the fluid inlet port 131a.

Therefore, all of the gaseous urea in the urea fluid passes through the slot holes 135a and flows into the internal space of the lower body 131, but only a part of the liquefied urea flows into the internal space of the lower body 131 while most of the liquefied urea cannot flow into the internal space of the lower body 131.

In the separator 130, resistance, which hinders the inflow of the liquefied urea, occurs by the liquid resistance portion 135, such that the inflow of the liquefied urea is automatically stopped, and additional injection of the urea is prevented after the injection of the urea is stopped as the leveling pipe 120 is shut off.

The upper body 132 has a central pipe 136 formed at the lower side thereof, and the central pipe 136 is inserted into the partition wall 133, and may integrally communicate with the first gas discharge port 132a.

Therefore, the gaseous urea flowing into the partition wall 133 is discharged to the outside through the central pipe 136.

The lower body 131 has a second gas discharge port 131b which may communicate with the internal space of the lower body 131 in order to recirculate the urea gas.

The second gas discharge port 131b is connected with the injection port 150 of the urea tank 110 through a recirculation line 152, and may allow the gaseous urea in the lower body 131 to be recirculated to the urea tank 110 by moving the gaseous urea in the lower body 131 to the injection port by negative pressure formed in the injection port 150.

Figure 8:
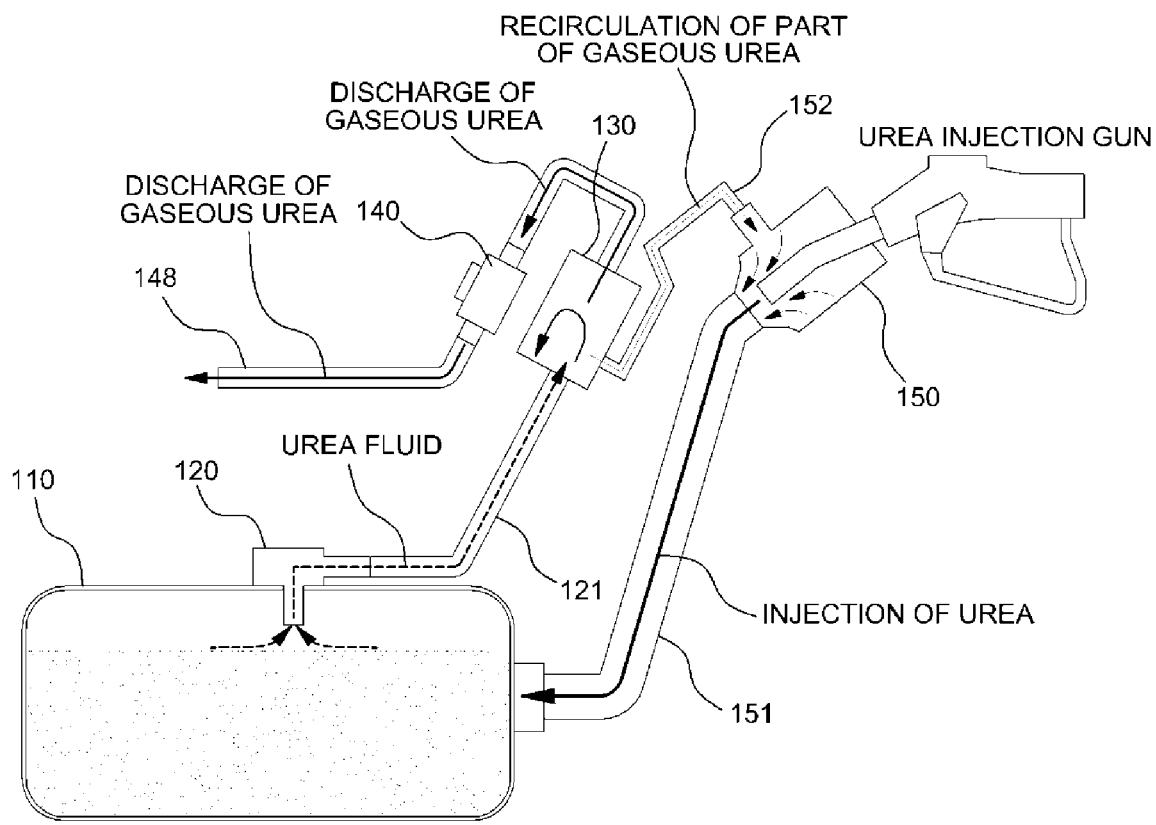
FIG. 8 is a view for explaining an operation state when urea is injected at a high speed in the SCR urea injection system according to the exemplary embodiment of the present invention.
Figure 9:
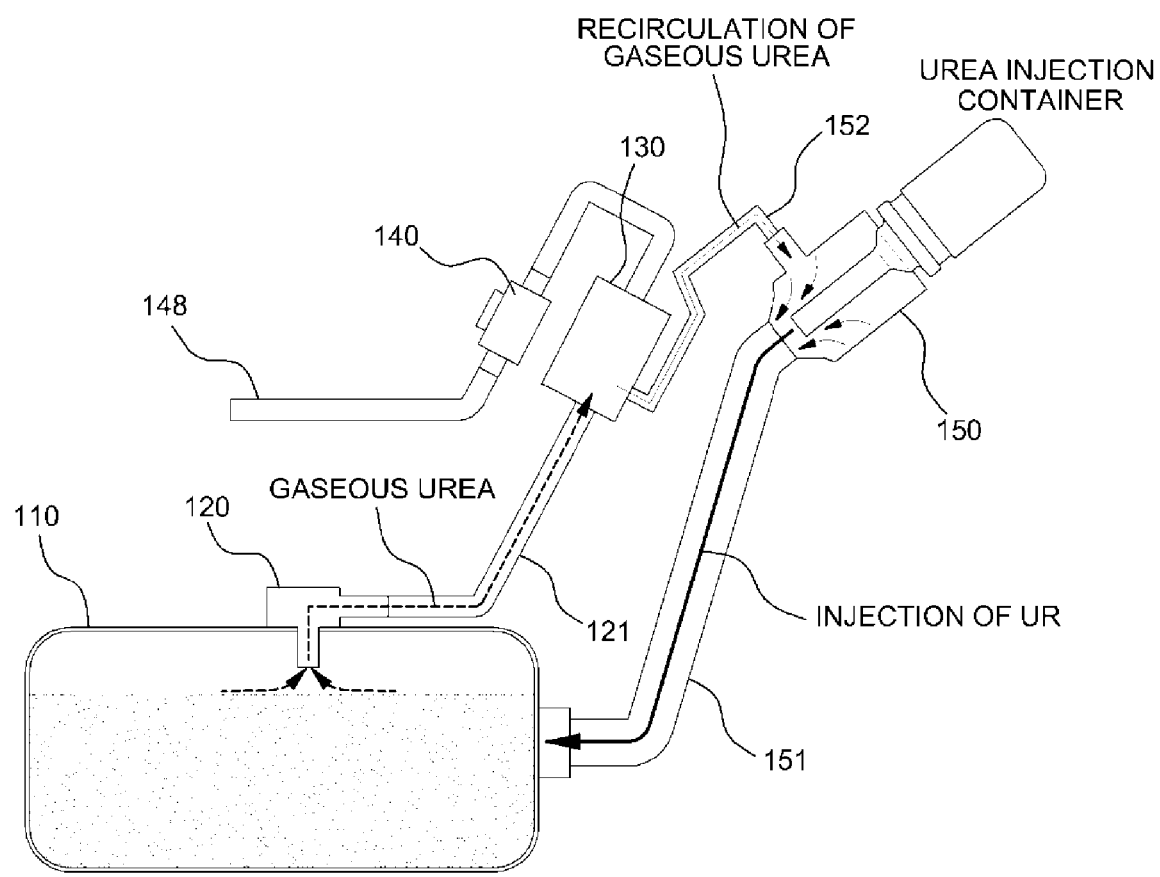
FIG. 9 is a view for explaining an operation state when urea is injected at a low speed in the SCR urea injection system according to the exemplary embodiment of the present invention.

Here, the recirculation line 152 transmits a part of the gaseous urea flowing into the separator 130 to the injection port when the urea is injected at a high speed (see FIG. 8), and transmits the entirety of the gaseous urea flowing into the separator 130 to the injection port 150 when the urea is injected at a low speed (see FIG. 9).

In the aforementioned separator 130, the urea fluid, which flows into the internal space of the lower body 131 while passing through the slot holes 135a, receives centrifugal force while passing through a space (flow path) that is surrounded by a side wall surface of the lower body 131, the partition wall 133, a bottom surface of the lower body 131, and the vent guide 134. Therefore, the relatively heavy liquefied urea flows outward from the space (flow path), and the light gaseous urea flows into the partition wall 133 while passing over the partition wall 133.

The gaseous urea, which flows into the partition wall 133 while passing over the partition wall 133, is discharged to the outside through the central pipe 136 and the first gas discharge port 132a, and the liquefied urea is collected in the urea tank 110 through the fluid inlet port 131a.

In this case, a tiny amount of liquefied urea may flow into the partition wall 133 together with the gaseous urea flowing into the partition wall 133, but only the gaseous urea may be discharged to the outside through the central pipe 136, and the liquefied urea remaining in the partition wall 133 may be discharged to the outside of the partition wall 133 through the liquid discharge port 133a so as to be collected in the urea tank 110.

Meanwhile, a check valve 140, which is opened and closed by pressure, is connected and installed in the first gas discharge port 132a of the separator 130.

The check valve 140 is opened and closed in the separator 130 by pressure of the gaseous urea that is discharged and supplied through the first gas discharge port 132a. The check valve 140 serves to block the urea from coming into contact with air by closing the urea tank 110 at normal times and when the urea is injected at a low speed, and serves to discharge the gaseous urea (ammonia) to the outside when the urea is injected at a high speed.

Figure 7:
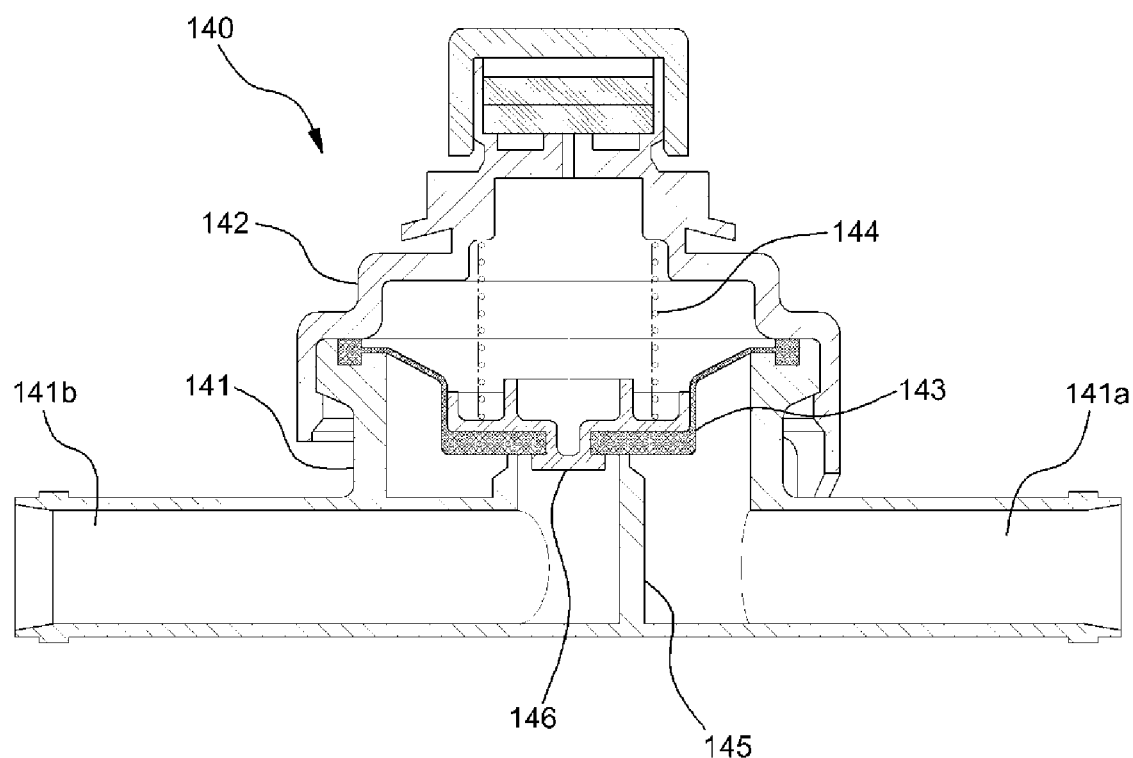
FIG. 7 is a configuration diagram illustrating a check valve according to the exemplary embodiment of the present invention.

As illustrated in FIG. 7, the check valve 140 includes a valve lower body 141, a valve upper body 142 which is coupled on an upper portion of the valve lower body 141, a diaphragm 143, and a return spring 144.

The valve lower body 141 has a valve inlet 141a which is connected to the first gas discharge port 132a of the separator 130 so as to communicate with the first gas discharge port 132a of the separator 130, and a valve outlet 141b for discharging the gaseous urea, and has a shut-off wall 145 which is formed between the valve inlet 141a and the valve outlet 141b, and may shut off the flow of the gaseous urea that flows into the valve inlet 141a.

The shut-off wall 145 may shut off the flow of the gaseous urea in conjunction with the diaphragm 143 installed between the valve lower body 141 and the valve upper body 142.

The diaphragm 143 is installed between the valve lower body 141 and the valve upper body 142 in a state in which a lower end portion of the diaphragm 143 is tightly attached to an upper end of the shut-off wall 145 so as to be detachable by pressure of the gaseous urea flowing into the valve inlet 141a.

The return spring 144 is installed between the valve upper body 142 and the diaphragm 143, and serves to restore the diaphragm 143, which is separated from the shut-off wall 145 while being pushed (or lifted) by pressure of the gaseous urea, using elastic restoring force.

For the purpose of a stable operation of the return spring 144, a spring support 146, which stably supports one side of the return spring 144, is installed on a lower portion of the diaphragm 143 that is tightly and separably attached to the shut-off wall 145.

At normal times or when the urea is injected at a low speed, the check valve 140 is closed by spring force so as to prevent contact between the urea tank 110 and outside air so that the concentration of the urea is maintained, and the occurrence of odor due to a leakage of the gaseous urea is prevented. When the urea is injected at a high speed, the check valve 140 is opened when internal pressure in the urea tank 110 reaches a predetermined level or more, such that the gaseous urea is discharged to the outside, thereby ensuring performance in injecting the urea.

An air vent line (see 148 in FIG. 1), which serves to allow the gaseous urea discharged through the check valve 140 to move to a location that is spaced apart from the injection port 150 of the urea tank 110, is installed to the valve outlet 141b of the check valve 140.

The air vent line 148 has one end connected to the valve outlet 141b, and the other end that is formed to be directed toward the opposite side to the injection port 150, such that the air vent line 148 serves to allow the urea gas, which is discharged from the check valve 140 when the urea is injected at a high speed, to be discharged to the opposite side to the injection port 150.

Hereinafter, an operational state when the urea is injected at a high speed, and an operational state when the urea is injected at a low speed in the SCR urea injection system will be described with reference to FIGS. 8 and 9.

As illustrated in FIG. 8, when the urea is injected at a high speed (for example, a maximum flow speed is 40 lpm) using a urea injection gun or the like, internal pressure in the urea tank 110 is increased as the urea is injected through the injection port 150, and the internal pressure in the urea tank 110 becomes greater than open pressure of the check valve 140 such that the check valve 140 is opened.

In this case, the urea fluid (the gaseous urea and a small amount of liquefied urea are mixed), which is discharged to the outside of the urea tank 110 through the leveling pipe 120, flows into the separator 130 through the urea vent line 121, and the gaseous urea discharged from the separator 130 is discharged to the outside through the check valve 140 and the air vent line 148.

The liquefied urea, which is separated from the gaseous urea in the separator 130, is drained from the separator 130, and then collected in the urea tank 110 through the urea vent line 121.

A part of the gaseous urea in the separator 130 is recirculated into the urea tank 110 through the recirculation line 152 by negative pressure formed in the injection port 150.

When the level of the urea in the urea tank 110 rises and the leveling pipe 120 is shut off when the urea is injected at a high speed, pressure in the urea tank 110 is instantaneously and rapidly increased such that the level of the urea in the urea injection line 151 rises, and the urea injection gun is automatically shut off such that the injection of the urea is completed.

As illustrated in FIG. 9, when the urea is injected at a low speed (for example, a maximum flow speed is 10 lpm) using a urea injection container, internal pressure in the urea tank 110 is increased as the urea is injected through the injection port 150, and the internal pressure in the urea tank 110 is smaller than the open pressure of the check valve 140 such that the check valve 140 is closed.

In this case, only the gaseous urea is discharged from the urea tank 110, and the discharged gaseous urea flows into the separator 130 through the urea vent line 121, and is recirculated to the urea tank 110 through the recirculation line 152 by negative pressure that is formed in the injection port 150 when the gaseous urea passes through the separator 130.

When the urea is injected at a low speed, the injection of the urea is completed after the entire amount of urea stored in the urea injection container is injected.

When the urea is injected at a high speed, the gaseous urea separated from the liquefied urea in the separator 130 is discharged to the check valve 140 through the central pipe 135 of the separator 130 as high pressure is formed in the urea tank 110, but when the urea is injected at a low speed, the entirety of the gaseous urea flowing into the separator 130 is recirculated through the recirculation line 152 as low pressure is formed in the urea tank 110.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A separator apparatus for separating fluid, comprising:
a fluid inlet port into which the fluid in which gas and liquid are mixed flows while being pressurized;
a lower body which has a partition wall formed in an internal space of the lower body that fluid-communicates with the fluid inlet port; and
an upper body which is assembled to an upper opening portion of the lower body, and has a first gas discharge port that fluid-communicates with the internal space of the lower body to discharge gaseous fluid flowing into the lower body,
wherein the partition wall divides the internal space of the lower body into a central portion and an outer peripheral portion on a basis of an axis thereof; wherein the upper body has a vent guide provided at a lower side thereof, and the vent guide is inserted between the lower body and the partition wall, and divides a space between the lower body and the partition wall into upper and lower spaces, wherein the vent guide is formed in a ring shape having an opened one side, and wherein the vent guide includes: a front end portion that faces the fluid inlet port; and a rear end portions formed in a spiral ring shape that is positioned at a higher position than the front end portion.

2. The separator apparatus of claim 1, wherein the vent guide has a liquid resistance portion having a plurality of slot holes formed in the front end portion that faces the fluid inlet port.

3. The separator apparatus of claim 1, wherein the upper body has a central pipe formed at a lower side thereof, and the central pipe is inserted into the partition wall of the lower body, and fluid-communicates with the first gas discharge port.

4. The separator apparatus of claim 1, wherein the partition wall has a liquid discharge port at one side, which faces the fluid inlet port, to discharge a liquefied fluid flowing into the partition wall to an outside of the partition wall.

* * * * *